US009340313B2

(12) United States Patent
Till

(10) Patent No.: US 9,340,313 B2
(45) Date of Patent: May 17, 2016

(54) LABELING ARRANGEMENT FOR LABELING BEVERAGE BOTTLES

(75) Inventor: Volker Till, Hofheim am Taunus (DE)

(73) Assignee: KHS GmbH, Dortmund (DE)

( * ) Notice: Subject to any disclaimer, the term of this patent is extended or adjusted under 35 U.S.C. 154(b) by 812 days.

(21) Appl. No.: 12/546,439

(22) Filed: Aug. 24, 2009

(65) Prior Publication Data

US 2010/0059163 A1 Mar. 11, 2010

Related U.S. Application Data

(63) Continuation-in-part of application No. PCT/EP2007/009792, filed on Nov. 13, 2007.

(30) Foreign Application Priority Data

Feb. 24, 2007 (DE) ........................ 10 2007 009 152

(51) Int. Cl.
*B29C 65/56* (2006.01)
*B32B 37/10* (2006.01)
(Continued)

(52) U.S. Cl.
CPC ................ *B65C 9/12* (2013.01); *B65C 9/1803* (2013.01); *B65C 9/36* (2013.01); *Y10T 156/10* (2015.01); *Y10T 156/12* (2015.01); *Y10T 156/1744* (2015.01)

(58) Field of Classification Search
CPC .... B29C 65/18; B29C 66/80; B29C 66/8167; B29C 66/83413; B29C 66/8351; B65C 9/265; B65C 9/36; B65C 9/1884; B65C 9/42; B65C 1/023; H01L 21/67144; B27D 1/04; Y10T 156/1744; Y10T 156/10; Y10T 156/12; Y10T 156/1994
USPC ......... 156/230, 238, 247, 249, 285, 289–291, 156/295, 446, 556, 559, 582
See application file for complete search history.

(56) References Cited

U.S. PATENT DOCUMENTS 3,379,466 A 4/1968 Hughes
3,745,083 A * 7/1973 Aungst et al. ................ 156/388
(Continued)

FOREIGN PATENT DOCUMENTS

DE 42 38 189 5/1994
DE 4238189 A1 * 5/1994
(Continued)

OTHER PUBLICATIONS

English translation of DE102006021056; Jun. 2007.*
(Continued)

*Primary Examiner* — Sonya Mazumdar
(74) *Attorney, Agent, or Firm* — Nils H. Ljungman & Associates

(57) ABSTRACT

A labeling arrangement for labeling beverage bottles. The abstract of the disclosure is submitted herewith as required by 37 C.F.R. §1.72(*b*). As stated in 37 C.F.R. §1.72(*b*): A brief abstract of the technical disclosure in the specification must commence on a separate sheet, preferably following the claims, under the heading “Abstract of the Disclosure.” The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

13 Claims, 16 Drawing Sheets

(51) Int. Cl.

| | |
|---|---|
| ***B32B 37/14*** | (2006.01) |
| ***B32B 37/22*** | (2006.01) |
| ***B32B 37/26*** | (2006.01) |
| ***B30B 15/00*** | (2006.01) |
| ***B65C 9/12*** | (2006.01) |
| ***B65C 9/36*** | (2006.01) |
| ***B65C 9/18*** | (2006.01) |
| *B32B 38/14* | (2006.01) |
| *B32B 38/18* | (2006.01) |

(56) References Cited

U.S. PATENT DOCUMENTS

| | | | | |
|---|---|---|---|---|
| 3,765,991 | A * | 10/1973 | Hoffmann | 156/521 |
| 3,888,725 | A * | 6/1975 | French | 156/556 |
| 4,046,613 | A * | 9/1977 | Kucheck et al. | 156/249 |
| 4,108,710 | A * | 8/1978 | Hoffmann | 156/450 |
| 4,137,121 | A * | 1/1979 | Muller | 156/571 |
| 4,217,164 | A * | 8/1980 | La Mers | 156/541 |
| 4,255,220 | A * | 3/1981 | Kucheck et al. | 156/285 |
| 4,363,685 | A * | 12/1982 | White | 156/212 |
| 4,876,839 | A * | 10/1989 | Honda et al. | 53/136.3 |
| 5,100,491 | A * | 3/1992 | Ijiri et al. | 156/220 |
| 5,309,695 | A * | 5/1994 | Frabetti et al. | 53/136.1 |
| 5,425,823 | A * | 6/1995 | Woodside, III | 156/64 |
| 5,771,657 | A * | 6/1998 | Lasher et al. | 53/55 |
| 5,776,289 | A | 7/1998 | Steidinger | |
| 6,099,940 | A * | 8/2000 | Hamilton et al. | 428/178 |
| 6,317,648 | B1 * | 11/2001 | Sleep et al. | 700/216 |
| 6,522,945 | B2 * | 2/2003 | Sleep et al. | 700/225 |
| 6,668,896 | B1 * | 12/2003 | Granero Tormo | 156/556 |
| 6,689,238 | B2 * | 2/2004 | Barnet | 156/60 |
| 6,763,870 | B2 * | 7/2004 | Spatafora et al. | 156/483 |
| 7,165,582 | B2 * | 1/2007 | Till | 141/89 |
| 7,192,502 | B2 * | 3/2007 | Spatafora et al. | 156/249 |
| 7,318,877 | B2 * | 1/2008 | Harte | 156/249 |
| 7,363,954 | B2 * | 4/2008 | Sleiman et al. | 156/539 |
| 7,398,811 | B1 * | 7/2008 | Duncan et al. | 156/392 |
| 7,708,042 | B2 * | 5/2010 | McCarthy et al. | 156/481 |
| 7,798,192 | B2 * | 9/2010 | Crum | 156/446 |
| 7,811,404 | B2 * | 10/2010 | Wade | 156/257 |
| 7,998,301 | B2 * | 8/2011 | Denholm et al. | 156/232 |
| 8,082,967 | B2 * | 12/2011 | Zacche et al. | 156/582 |
| 8,206,543 | B2 * | 6/2012 | Crum et al. | 156/267 |
| 2002/0026768 | A1 * | 3/2002 | Duncan et al. | 53/52 |
| 2006/0260756 | A1 * | 11/2006 | Spatafora | 156/539 |
| 2006/0277269 | A1 * | 12/2006 | Dent et al. | 709/217 |
| 2007/0093935 | A1 * | 4/2007 | Fu | 700/237 |

FOREIGN PATENT DOCUMENTS

| | | | |
|---|---|---|---|
| DE | 197 19 420 | | 11/1998 |
| DE | 19719420 | A1 * | 11/1998 |
| DE | 102 23 234 | | 12/2003 |
| DE | 10223234 | A1 * | 12/2003 |
| DE | 20 2005 007 470 | | 7/2005 |
| DE | 202005007470 | U1 * | 8/2005 |
| DE | 20 2006 011 787 | | 9/2006 |
| DE | 202006011787 | U1 * | 11/2006 |
| DE | 10 2006 021 056 | | 6/2007 |
| DE | 102006021056 | * | 6/2007 |
| WO | WO 2007/077036 | | 7/2007 |
| WO | WO 2008101527 | A1 * | 8/2008 |

OTHER PUBLICATIONS

English translation of DE10223234; Dec. 2003.*

English translation of DE19719420; Nov. 1998.*

English translation of DE20200500740; Jul. 2005.*

English translation of DE4238189; May 1994.*

English translation of DE 202006011787U1, Nov. 2006.* http://www.thefreedictionary.com/adhesive—"The American Heritage® Dictionary of the English Language, 4th Edition." 2000, Houghton Mifflin Company.*

WO2008101527—English translation of description and claims; Aug. 28, 2008.*

Definition of "adhesion", http://dictionary.reference.com/browse/adhesion.*

Kent, Peter. "Researchers discover how geckos know when to hold tight." Clemson.edu. Aug. 6, 2009. <http://www.clemson.edu/news-room/articles/2009/august/geckos.php5>.

Steenhuysen, Julie. "Gecko-like glue is said to be stickiest yet." Reuters.com. Oct. 9, 2008. <http://www.reuters.com/article/scienceNews/idUSN0942431020081009>.

Rensselaer Polytechnic Institute. "Nanotube adhesive sticks better than a gecko's foot." Physorg.com. Jan. 17, 2007. <http://www.physorg.com/news101460241.html>.

University of Akron. "UA synthetic gecko foot-hairs leading to reusable adhesives." Uakron.edu. Aug. 12, 2005. <http://www.uakron.edu/news/articles/uamain_1293.php>.

International Search Report PCT/EP2007/009792 and English translation thereof.

International Preliminary Report on Patentability PCT/EP2007/009792 and English translation thereof.

* cited by examiner

LABELING ARRANGEMENT FOR LABELING BEVERAGE BOTTLES

CONTINUING APPLICATION DATA

This application is a Continuation-In-Part application of International Patent Application No. PCT/EP2007/009792, filed on Nov. 13, 2007, which claims priority from Federal Republic of Germany Patent Application No. 10 2007 009 152.6, filed on Feb. 24, 2007. International Patent Application No. PCT/EP2007/009792 was pending as of the filing date of this application. The United States was an elected state in International Patent Application No. PCT/EP2007/009792.

BACKGROUND

1. Technical Field

The present application relates to a labeling device for containers in which the transport elements have one or more structured contact surfaces with elevated adhesion, and the labels are held exclusively by adhesion forces. The structured surface is thereby formed by a plurality of projections which have a base section and a top section, whereby the top section has an end surface which is directed away from the surface, whereby each projection is of a size such that the end surfaces are at the same vertical distance from the base surface and form an adhesive contact surface which is interrupted by the spaces between the end surfaces, whereby the base parts are inclined with respect to the surface normal.

2. Background Information

Background information is for informational purposes only and does not necessarily admit that subsequently mentioned information and publications are prior art.

Labeling machines are used for example in the beverage bottling industry. The labels coming from a storage buffer are thereby cut from a strip, lifted off a stack or swiped off. Some labeling machines have the labels coming from the strip guided by means of a transport roller, among other means. The labels are held onto the surface of the transport roller for the transport by means of a vacuum.

In some labeling machines, the labels are present in the form of a stack and are lifted by means of individual elements to which a vacuum is applied and are transferred to a suction conveyor belt. Some machines include an additional device in which labels are extracted in the form of individual sheets. In this process, the adhesive surfaces of a glue applicator apparatus are provided with a glue film. Then these glued adhesive surfaces are rolled across the forward-most label of a label stack, as a result of which the label is extracted. Then the label is transported to a labeling cylinder which can be provided with grippers, for example.

These devices are theoretically well suited to the task they are designed to perform and are in wide use, although grippers are wear parts that require and/or desire regular maintenance or replacement. For the vacuum operation, vacuum pumps and corresponding lines are necessary and/or desired which increase the space required and/or desired by the apparatus and require and/or desire additional operating means. Vacuum systems are also maintenance-intensive and as a result of the air intake, particles of dirt are sucked in and get into the vicinity of the labeling systems, which results in corresponding contamination or the need and/or desire for cleaning.

OBJECT OR OBJECTS

An object of the present application is therefore to make available a device which requires and/or desires less maintenance and at the same time offers increased process security.

SUMMARY

This object is accomplished by the device according to the present application. The present application thereby relates to a labeling device for containers comprising at least one transport element for the transport, transfer and application of labels, whereby the transport element has at least one contact element with at least one contact surface on which, when the device is in operation, at least one label is held so that the label can be transferred to the surface of the container, whereby the contact surface has one or more surface areas with elevated adhesion. In at least one possible embodiment according to the present application, the surfaces are configured so that the adhesion forces in contact with the corresponding surface are essentially Van der Waal forces.

In one configuration of the structured surface with elevated adhesion, this surface has a plurality of projections with a base section and a top section, whereby the top section has an end surface which is directed away from the base surface, and whereby the size of each projection is determined so that the end surfaces are at the same vertical distance from the base surface and form an adhesive contact surface which is interrupted by the spaces between the end surfaces, whereby the base parts are inclined with respect to the surface normal.

Such surfaces mimic the ability of the gecko to adhere to surfaces and act passively and do not require and/or desire any additional operating equipment or supplies. In at least one possible embodiment according to the present application, the plurality of neighboring end surfaces are separated by a distance of between one nanometer and ten micrometers. In at least one possible embodiment according to the present application, the characteristic cross section geometry of the end surfaces lies between one nanometer and five micrometers. "Characteristic cross section geometry" as used here means primarily the edge length or the radius. With regard to the base section, in one possible embodiment, the base part is has an inclination with respect to the surface normal of between twenty degrees and forty degrees.

In at least one possible embodiment according to the present application, depending on the individual transport task, an adhesive surface with a special adhesion force can be used. The modification of the adhesive force can be achieved by a variation or one or more of the parameters listed below:

a) angle of inclination of the base part b) average distance between the end surfaces c) number of end surfaces on the contact surface d) distance of the end surfaces from the base surface e) average characteristic cross section geometry Therefore in one improved configuration, the transport element is formed at least by a base body and one or more carrier elements, whereby the carrier elements can easily be mechanically detached from the base body, and the above mentioned contact surface is located on these carrier elements. For example, the carrier elements can be changed quickly and the overall device can be adapted to the requirements of the transport tasks at hand.

In at least one possible embodiment according to the present application, at least one gas outlet is located in the contact surface, which gas outlet is in communication by means of suitable devices with a gas pressure line. During operation, a current or puff of gas can be applied to the adhering side of the label being transported to thereby assist in the process of releasing the label from the carrier element. For the smooth transfer from a first carrier element to a second carrier element or to the container, in at least one possible embodiment, a plurality of gas outlets may be located, for example in a row next to one another or combined with one another, in the vicinity of the adhering surface.

In the improved variant, the adhesion surface has an adhesion gradient which can be lower in the forward direction of transport of the label, so that it can be released more easily in the first transfer and adhesion area onto a subsequent surface. A variant of this type maybe utilized or adapted for use on a cutting roller, for example. Basically the objective is to achieve the maximum possible adherence of a label, in one possible embodiment on a cutting roller, because the mechanical action of the separating tool can push the label out of the optimal position or fold or wrinkle it. A maximum adhesive adherence, however, interferes with the transfer to a subsequent transport element. Therefore the variant comprises shaping the surfaces to the left and right of the cutting line so that they have different adhesive forces. Therefore when the device is operating properly, ideally the rear end of the label to be separated is fixed in position with the maximum possible adhesion force onto the cutting roller, whereby the subsequent, uncut label which forms the end of the strip is held in the area adjacent to the cutting edge with a slightly lower adhesion force.

This part of the label, which sticks to the surface in the area of lower adhesion, for the remainder of the process is first transferred to a subsequent transport element or container. The transfer to a transport element with higher adhesion is thereby made easier.

In at least one possible embodiment, the material of which the adhesion surface is made may be selected in order to achieve a desired adhesiveness, and further could be selected in view of the material from which the labels to be held by the adhesion surface are made. For example, if the labels are made from plastic, an adhesion surface made of a particular material may be selected which provides the desired adhesive force to the plastic, whereas, for example, if the labels are made from paper, an adhesion surface made of a different material more suitable for paper may be selected. In addition, different materials may produce greater adhesive forces than other materials, so the material from which the adhesion surface is made could be selected depending on the amount of adhesive force desired. Further, in at least one possible embodiment, different materials could be utilized in a single adhesive structure to produce an adhesive surface with areas which produce greater and lesser adhesive forces with respect to one another.

The present application also comprises a method for the labeling of containers in which a device described in one of the above embodiments is used, whereby during transport or processing, the label is held in a suitable position by adhesion forces. In at least one possible embodiment of the present application, the effective adhesion forces may be exclusively or essentially Van der Waal forces. The method according to the present application comprises at least the following steps:

a) The contact surface is placed in contact with the surface of label which is located in a storage device.

b) The label is lifted or extracted from the storage device.

c) The label adhering to the contact surface is delivered to the container surface.

d) At least a first partial surface of the label is placed in contact with and made to adhere to the surface of the container.

e) Full separation of the contact surface and the label.

After step b) and before the transfer to the container, the label can thereby be transferred to the surface of a tool on which the labels are processed, e.g. cut off on a rotating blade. The subsequent transfer is performed in an analogous manner. In one configuration of the process, before step d) an adhesive is applied to at least a partial area of one side of the label.

For an improved transfer of the label to a neighboring surface, simultaneously or substantially simultaneously with or immediately or substantially immediately after the label is first brought into contact with this downstream surface, a gas current or gas puff can be applied to the adhering side of the label. Therefore one application of the present application is the use of the method or device described above in a configuration to apply labels to containers which are from the group comprising bottles, bags, cans or similar formats, or to apply labels to box-like containers with essentially flat side walls.

The above-discussed embodiments of the present invention will be described further herein below. When the word “invention” or “embodiment of the invention” is used in this specification, the word “invention” or “embodiment of the invention” includes “inventions” or “embodiments of the invention”, that is the plural of “invention” or “embodiment of the invention”. By stating “invention” or “embodiment of the invention”, the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
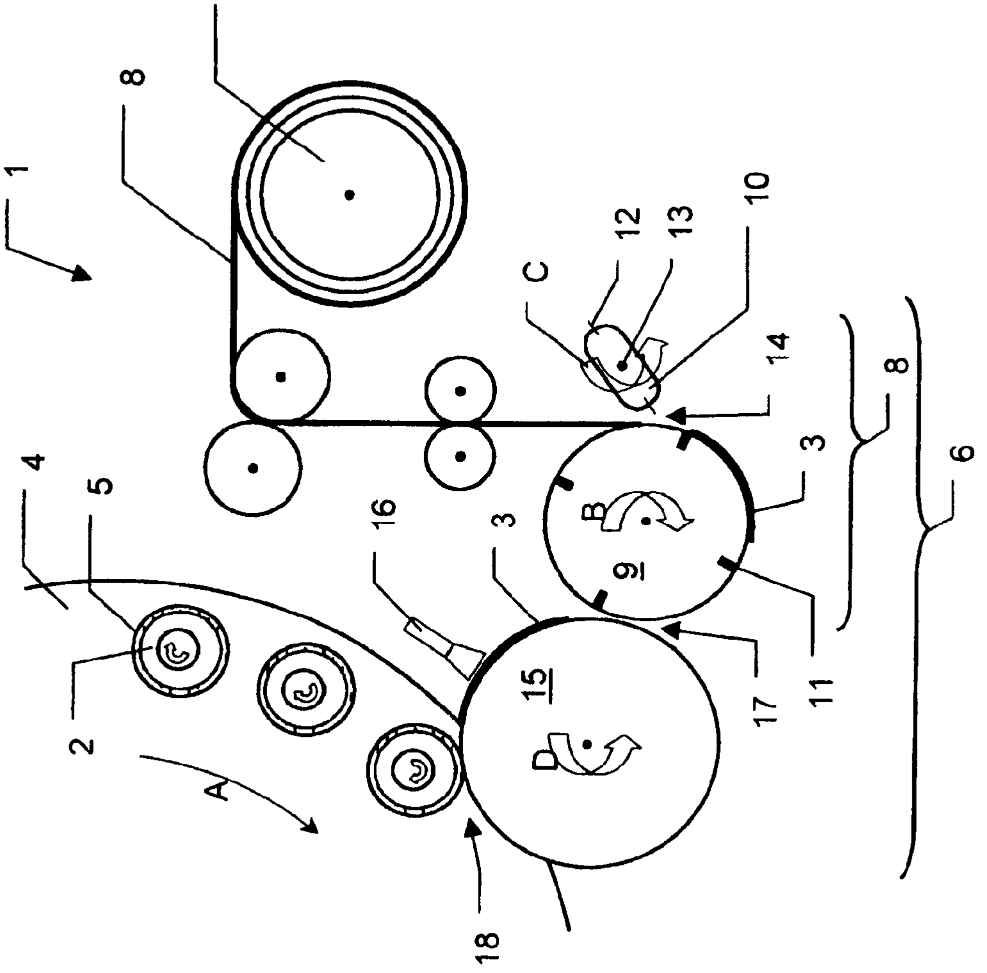
FIG. 1 shows by way of example and in a schematic partial view and in a plan view a labeling machine for the labeling of containers with all-around or wrap-around labels.

The labeling machine that employs a rotary construction and is designated 1 in general in FIG. 1 is used for the labeling of containers 2 which are realized in the form of bottles with labels 3, and in one possible embodiment in the illustrated embodiment with all-around or wrap-around labels.

The labeling machine 1, in a manner that will be familiar to a technician skilled in the art, comprises among other things a rotor 4 which is driven in rotation around a vertical machine axis in the direction indicated by the Arrow A. On the periphery of the rotor 4 there are a plurality of container carriers 5 in the form of turntables, on each of which, during the labeling operation, one container 2 is held in the upright position, i.e. with its container axis in the vertical direction oriented parallel or substantially parallel to the machine axis. The containers 2 to be labeled are fed to the labeling machine 1 or to the rotor 4 at a container inlet (not shown). The containers 2 to be labeled leave the labeling machine at a container outlet (also not shown).

For labeling, the containers 2 located on the turntables 5 are advanced with the rotor 4 past at least one labeling unit 6, which is realized for the processing of a strip-format label material which is extracted from at least one storage mechanism 7 (roll of label strips), from which the individual labels 3 are produced by separation or cutting. For this purpose, the labeling unit 6 has, among other things, a cutting device 8 which comprises essentially an adhesion cylinder 9 and a blade carrier 10. The adhesion cylinder 9 is oriented with its axis of rotation in the vertical direction, i.e. parallel or substantially parallel to the machine axis of the rotor 4, and on the peripheral surface of the self-adhesive cylinder 9 has a plurality of strip-like cutting elements or stationary blade 11, which are oriented with their longitudinal dimension parallel or at least essentially parallel to the axis of rotation. The rotating cylinder surface is thereby covered by the adhesion surface according to the present application, so that once the labels come into contact with this surface they adhere to it.

In the illustrated embodiment there are a total of four stationary blades 11 at uniform angular intervals, i.e. at an equal angular distance from one another, around the axis of the adhesion cylinder 9. The blade carrier 10 is realized, for example, on its periphery with two cutting blades 12 that interact with the stationary blades 11 and are each oriented in the vertical direction or essentially in the vertical direction and are offset from each other by one hundred eighty degrees around the axis 13 of the blade carrier 10 and are each at the same radial distance from this axis.

The self-adhesive cylinder 9 and the blade carrier 10 between them form a cutting gap 15 through which the strip-format label material is guided. By means of appropriate drive mechanisms, the self-adhesive cylinder 9 can be driven around its axis of rotation during the labeling, so that the cylinder surface rotates in the direction indicated by the arrow B. By means of a controllable servo-drive, the blade carrier 10 can be driven around its axis in the direction indicated by the arrow C, and namely opposite to the direction of rotation of the self-adhesive cylinder 9 so that in the vicinity of the cutting gap 4, the stationary blade 11 and cutting blade 12 each move in the same direction. On account of the interaction of each of the cutting blades 12 with a stationary blade 11, in the cutting situation or at the time of the cutting, the length required and/or desired for the label 3 is cut from the strip-format labeling material in a controlled manner.

The label which is thus obtained and is first held on the cylinder surface of the self-adhesive cylinder 9 on its unprinted front side is then transferred to the cylinder surface of a glue applicator cylinder 15. The present application teaches that the glue applicator cylinder 15 is also provided with self-adhesive surfaces, whereby the adhesive force of these self-adhesive surfaces can be different from the adhesive force of the surface 9. The adhesive force of the cylinder surface of the glue applicator cylinder 15 can be greater, for example, than that of the first self-adhesive cylinder 9, so that there is an automatic transition from one cylinder to the other.

The label 3 which is held onto the cylinder surface of the glue applicator cylinder 15 with the printed side of the label is provided with adhesive on portions of its reverse side, whereby the glue is deposited by means of the gluing station 16 in the known manner in the form of lines on the reverse side of the label. This glue, in interaction with the container surface, has a greater adhesive force than the self-adhesive surfaces of the cylinder surface of the glue applicator cylinder 15. When the device is properly operated, a container 2 which is moved past the labeling unit is labeled by the transfer and rolling of the label 3 as described above.

On the self-adhesive cylinder 9 and on the glue applicator cylinder 15, there are gas outlets (not shown), by means of which a puff of compressed air can be emitted into the transfer gap 16 between the cylinders 9 and 15, but also into the transfer gap 17 between the glue applicator cylinder 15 and the container 2, in the known manner, to assist in the release of the label from the one element and its adherence to the respective next element downstream.

Figure 2:
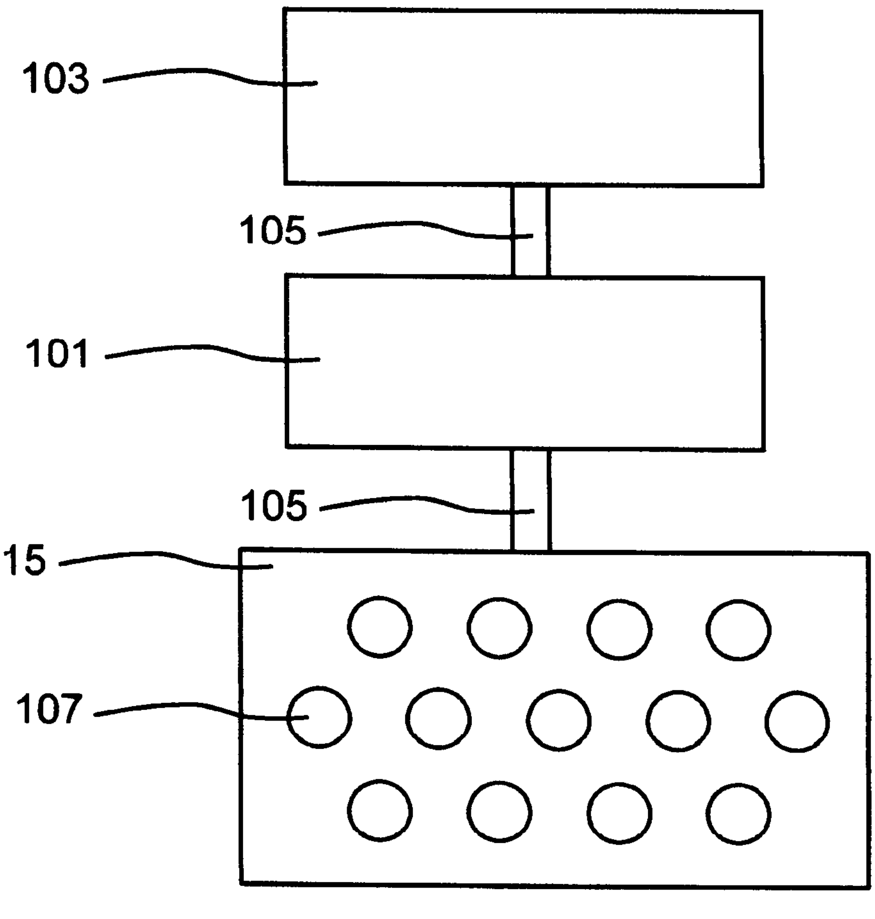
FIG. 2 shows a gas transport arrangement in use with the present application.

FIG. 2 shows one possible embodiment of a gas transport arrangement that may be used in conjunction with the adhesion surface of the present application. Gas may be supplied to the surface of the roller 15 by a source of gas 103. A valve 101 may control the release or ejection of gas from the source 103. A gas duct or pipe 105 may permit the flow of gas from the source 103, through the valve 101, to the roller or cylinder 15. The surface of the cylinder 15 may comprise a plurality of holes 107. The holes 107 permit the flow of gas and may aid in the transfer of a label 3 from the surface of the roller 15 to a beverage bottle or container 2. The holes 107 are arranged in a pattern of substantially parallel rows. The holes 107 are shown for exemplary purposes. The diameters of the holes 107 may vary and range in a plurality of sizes from nanometers to millimeters. Other patterns of holes 107 are also within the scope of the present application.

Figure 3:
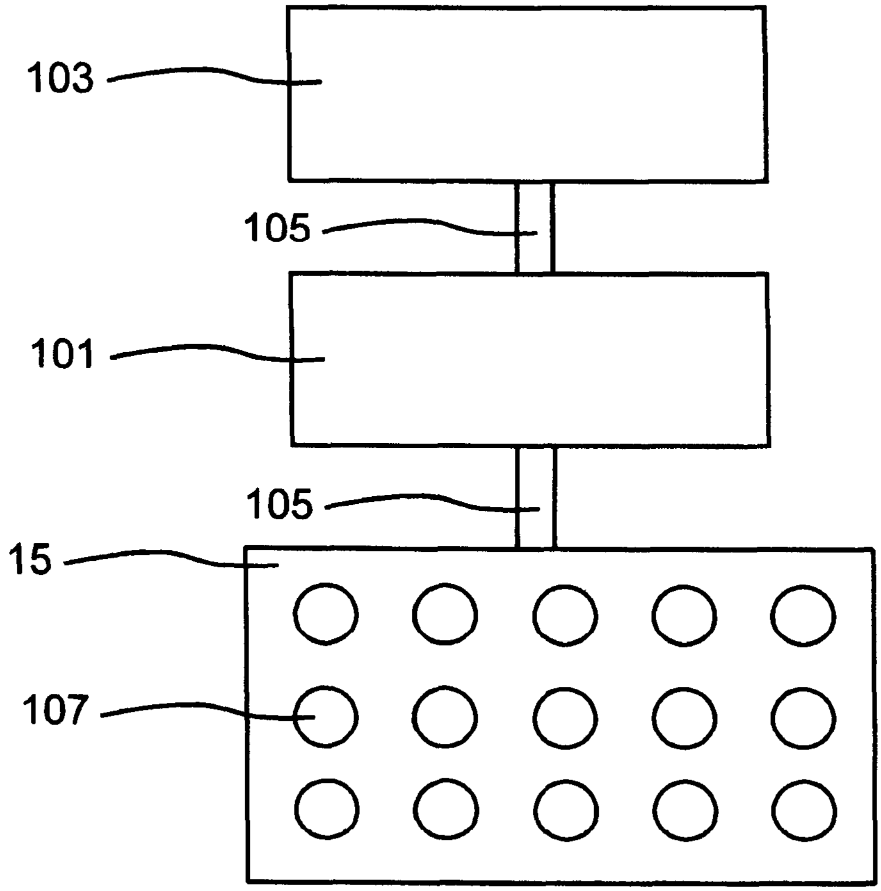
FIG. 3 shows another gas transport arrangement in use with the present application.

FIG. 3 shows one possible embodiment of a gas transport arrangement that may be used in conjunction with the adhesion surface of the present application. Gas may be supplied to the surface of the roller 15 by a source of gas 103. A valve 101 may control the release or ejection of gas from the source 103. A gas duct or pipe 105 may permit the flow of gas from the source 103, through the valve 101, to the roller or cylinder 15. The surface of the cylinder 15 may comprise a plurality of holes 107. The holes 107 permit the flow of gas and may aid in the transfer of a label 3 from the surface of the roller 15 to a beverage bottle or container 2. The holes 107 are arranged in a pattern of substantially parallel rows and substantially parallel columns. The holes 107 are shown for exemplary purposes. The diameters of the holes 107 may vary and range in a plurality of sizes from nanometers to millimeters.

Figure 4:
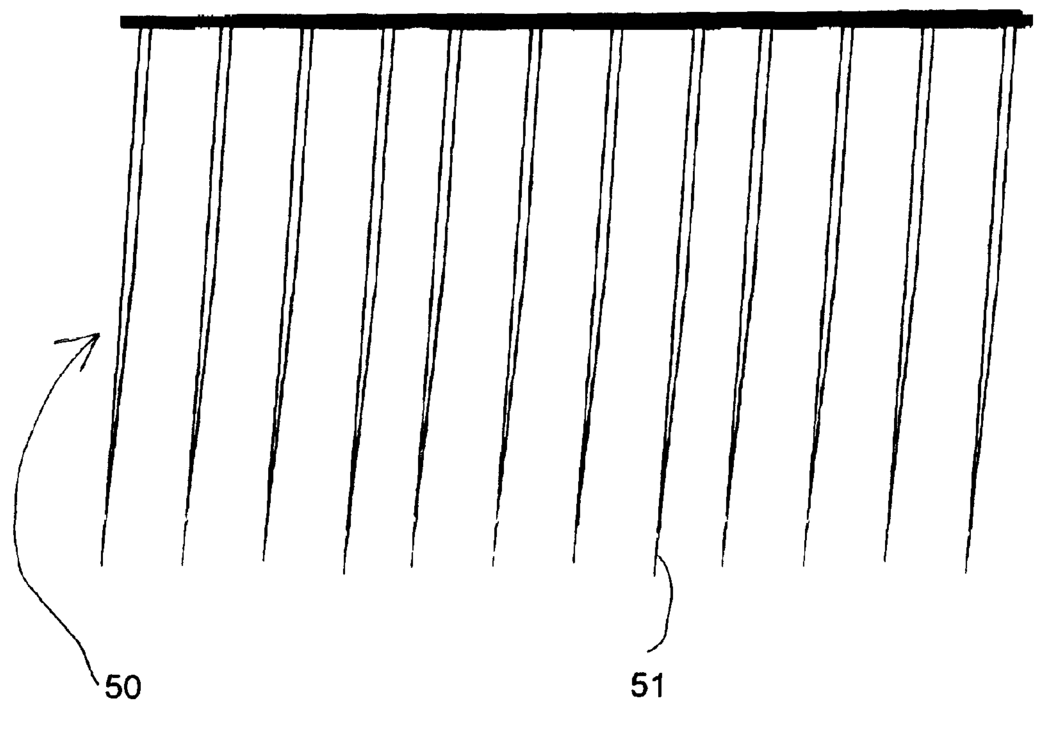
FIG. 4 shows one possible embodiment of a contact surface of the present application.

FIG. 4 shows one possible cross section of one possible embodiment of the adhesion surface of the present application. The projections 50 extend from the surface of the glue applicator cylinder 15 and comprise front surfaces 51. A contact surface is formed by the totality of the front surfaces 51. When establishing an adhesive connection, the contact surface touches the surface of the respective other object, for example a label 3, without establishing an anchorage and without any interlocking of the projections. The adhesive connection is achieved by van der Waals forces. Additional contributions can be made by electrostatic forces or capillary forces. The spacing between the projections 50 may be smaller than the cross-sectional dimensions of the front surfaces 51.

The projections 50 may be bendable or flexible, so that the front surfaces 51 may contact the label 3. FIG. 4 illustrates an embodiment of the present application which due to its asymmetric holding force is relevant to technological application. Very substantial adhesive force is attained which can nevertheless be undone with little effort—a feature which is significant for pick-and-place applications. FIG. 4 shows a lateral view of the surface structure according to the present application, with the projections 50 being substantially perpendicular to the direction of inclination. The projections 50 may comprise a width in the range of twenty nanometers to one thousand nanometers and a thickness in the range of five nanometers to one hundred nanometers. The spacing between individual projections 50 is selected depending on the application and depending on the setting of the width of the front surfaces 16.

The projections 50 are aligned in space at a desired or predetermined inclination. If a contact is established, the projections 50 are bent. As a result of the inclination of the projections 50, the projections 50 are bent in the same direction. The adhesion contact is formed between the front surfaces 51 and the label 3.

Figure 5:
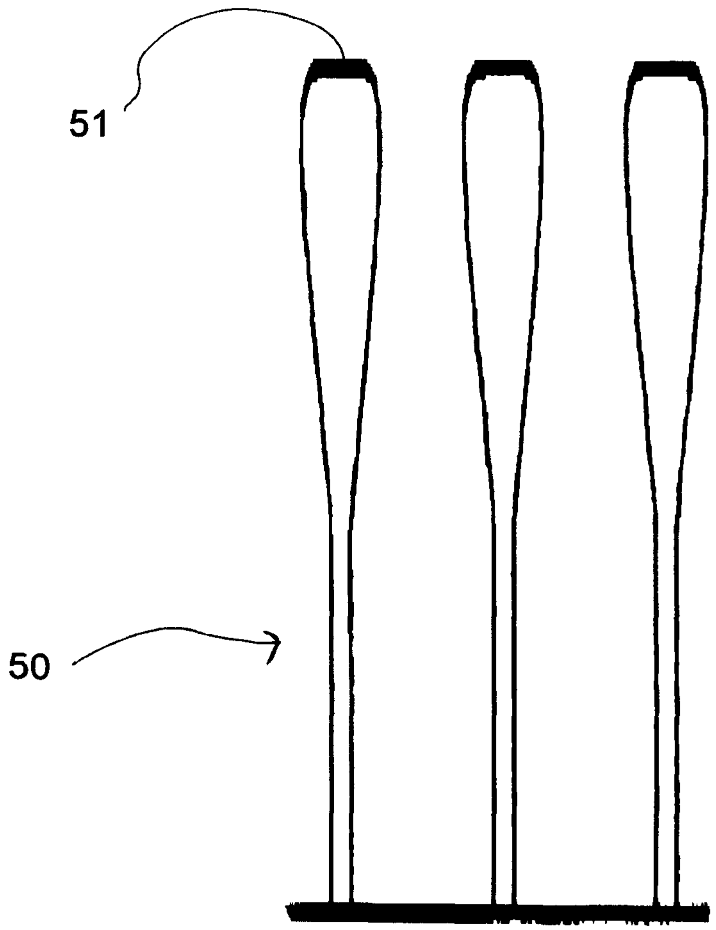
FIG. 5 shows another possible embodiment of a contact surface of the present application.

FIG. 5 shows one possible cross section of one possible embodiment of the adhesion surface of the present application. The projections 50 extend from the surface of the glue applicator cylinder 15 and comprise front surfaces 51. A contact surface is formed by the totality of the front surfaces 51. When establishing an adhesive connection, the contact surface touches the surface of the respective other object, for example a label 3, without establishing an anchorage and without any interlocking of the projections. The adhesive connection is achieved by van der Waals forces. Additional contributions can be made by electrostatic forces or capillary forces. The spacing between the projections 50 may be smaller than the cross-sectional dimensions of the front surfaces 51.

FIG. 5 shows a lateral view of the surface structure according to the present application, with the projections 50 being substantially parallel to the direction of inclination. The projections may comprise a width in the range of twenty nanometers to one thousand nanometers and a thickness in the range of five nanometers to one hundred nanometers. The spacing between individual projections 50 is selected depending on the application and depending on the setting of the width of projections 50.

Figure 6:
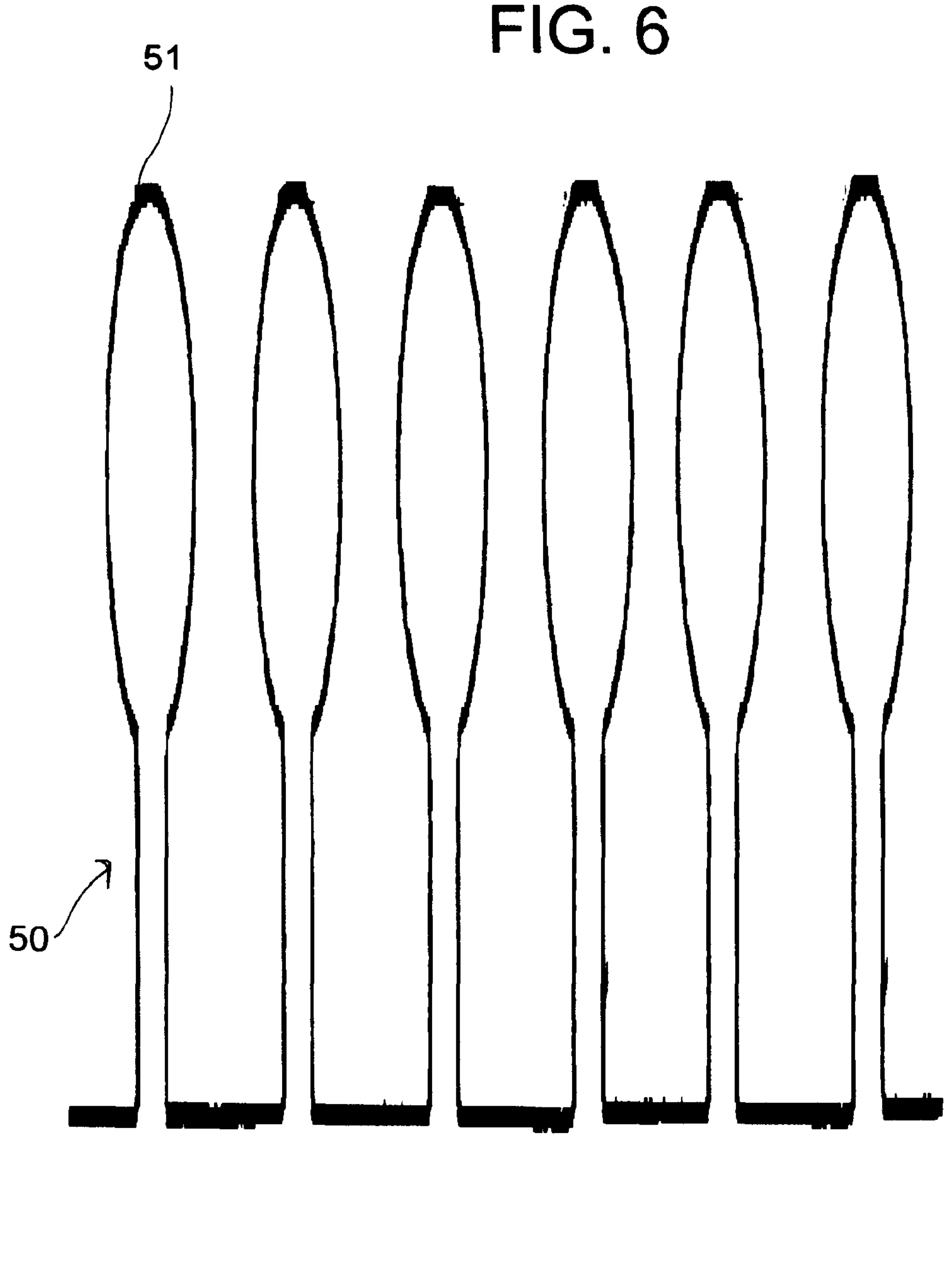
FIG. 6 shows another possible embodiment of a contact surface of the present application.

FIG. 6 diagrammatically shows a section of various surface structures in an enlarged view. These diagrams are merely used for illustrative purposes; implementation of the invention is not limited to the geometric shapes shown. According to FIG. 6, the projections 50 each comprise a front surface 51 which is delimited by a straight margin (e.g. rectangle, square, polygon) or a curved margin. The front surface 51 may be flattened or domed according to the above-mentioned principles. The front surfaces 51, which are formed at the same height, form the contact surface according to the present application.

Figure 7:
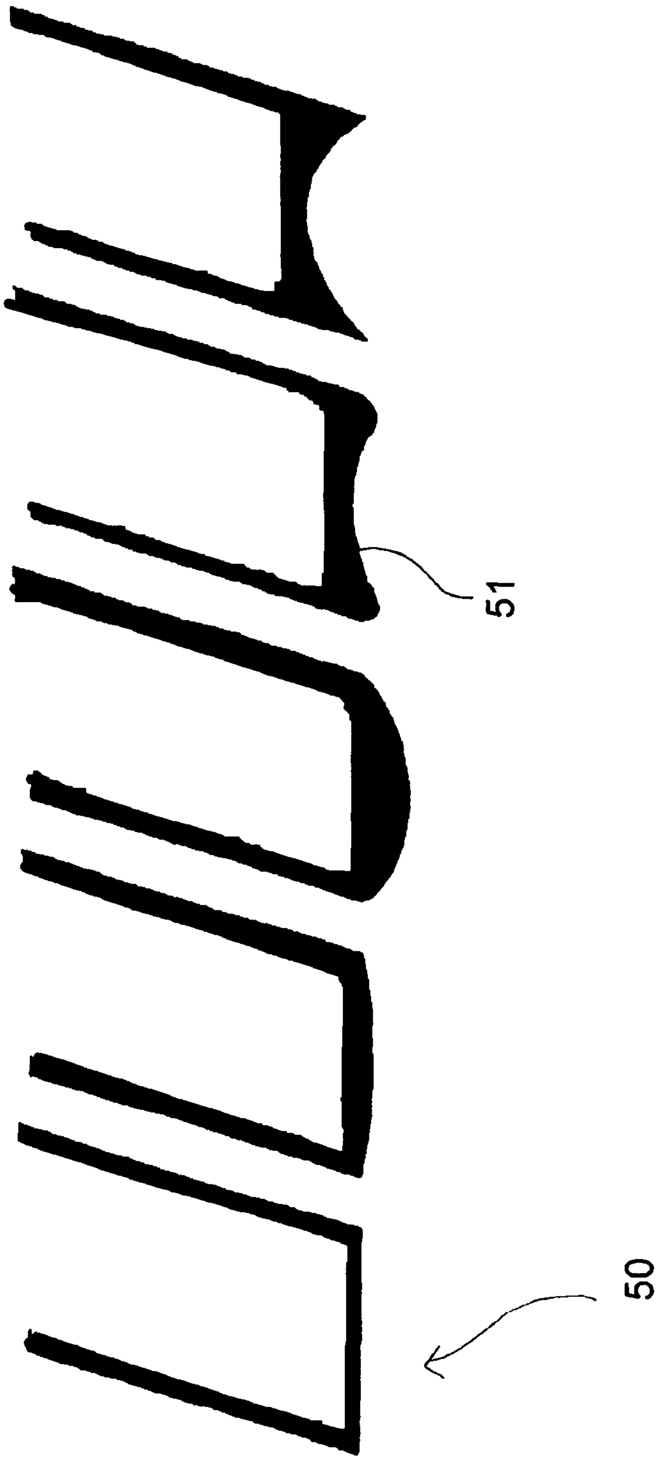
FIG. 7 shows another possible embodiment of a contact surface of the present application.

FIG. 7 shows the plane front surface 51, and also variants of projections 50 with the following front surface shapes: hemispheric shape, cylindric shape or torus shape, or bowl shape. The diameters of the projections 50 are for example in the range of twenty nanometers to twenty micrometers, with the radii of curvature being selected in the range between five millimeters and half the diameter of the projection. In the left-most projection 50, the radius of curvature is infinite. The cylinder shapes or torus shapes comprise a concave shape of the front surface of a reduced diameter, which is for example one-tenth of the diameter of the respective projection 50. The bowl shape means that the front surface 51 comprises an indentation of curved or almost rectangular cross section.

Figure 8:
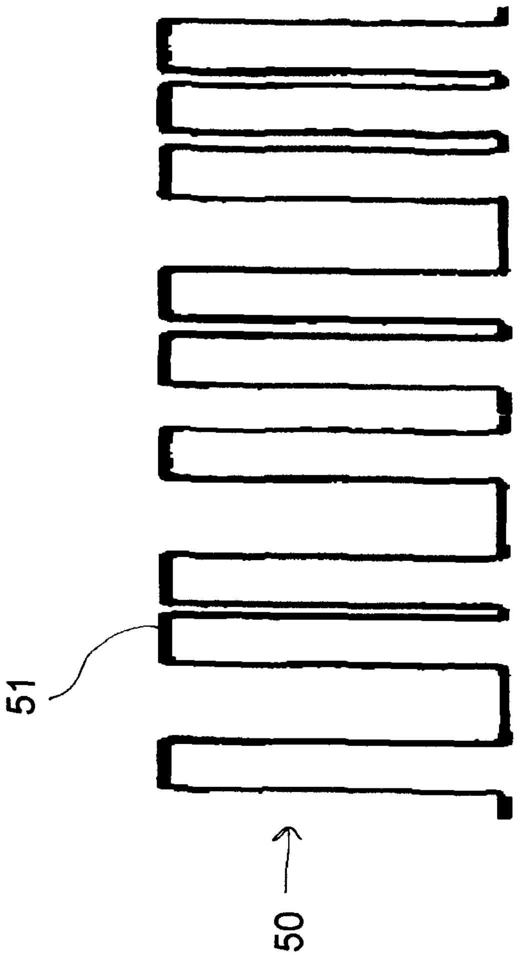
FIG. 8 shows another possible embodiment of a contact surface of the present application.

FIG. 8 shows a plurality of projections 50, each of which comprises a front surface 51. The projections 50 are spaced out unevenly, i.e. with varying distances between each of the projections 50.

Figure 9:
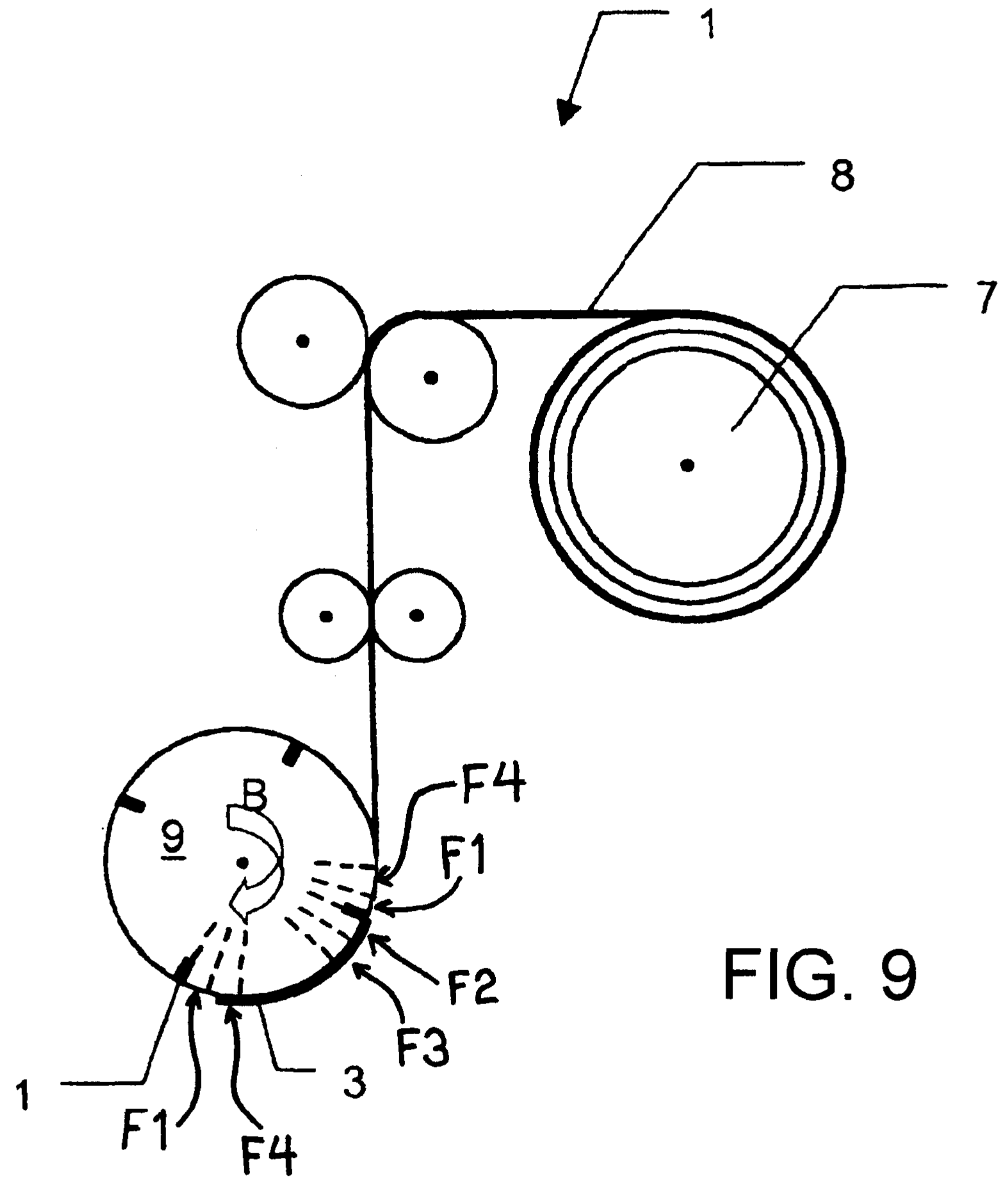
FIG. 9 shows one possible embodiment of an adhesion roller in use with the labeling machine of the present application.

FIG. 9 shows one possible embodiment of a roller 9 in use with the labeling device of the present application. The roller 9 comprises an adhesion gradient from a lowest amount of adhesion F1 to a highest amount of adhesion F4. The leading edge of the cut label 3 is held in contact with the roller 9 with a lesser gradient of adhesion. The trailing edge of the cut label 3 is held in contact with the roller 9 with a higher gradient of adhesion.

Figure 10:
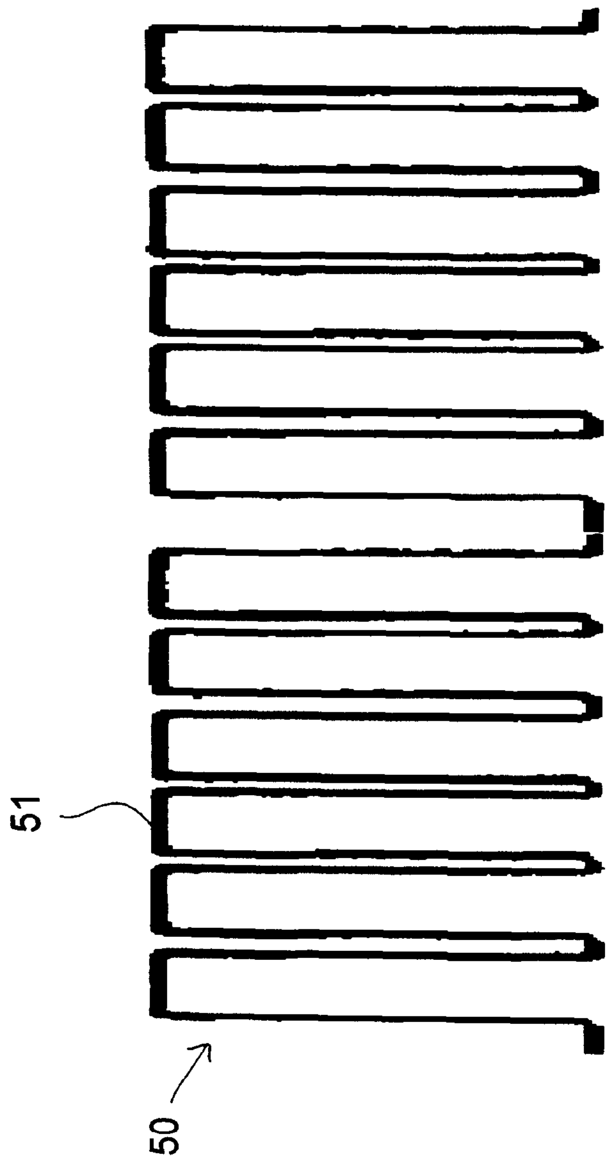
FIG. 10 shows another possible embodiment of a contact surface of the present application.

FIG. 10 shows a plurality of projections 50, each of which comprises a front surface 51. The projections 50 are spaced out evenly or have a substantially equal distance between each individual projection 50.

Figure 11:
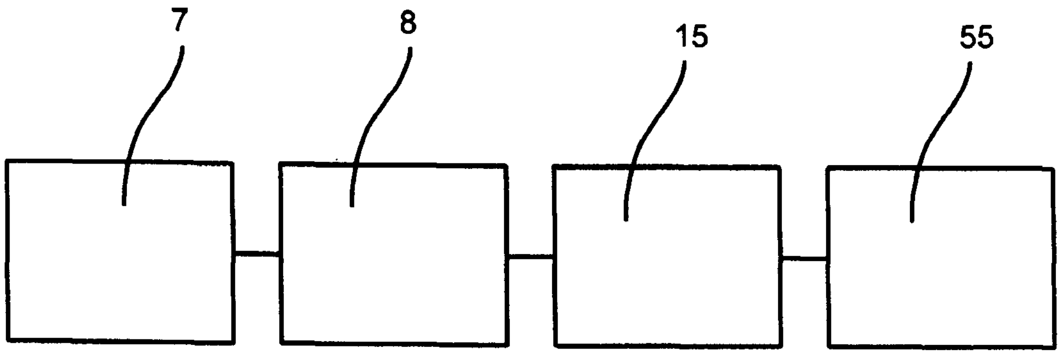
FIG. 11 is a block diagram of a labeling device according to the present application.

FIG. 11 shows a block diagram of one possible embodiment of the present application. A storage mechanism 7 is configured to provide label material to a cutting device 8. The cutting device 8 cuts the label material into individual labels 3. The label 3 may then be transferred from the cutting device 8 to the glue applicator cylinder 15. The glue applicator cylinder 15 comprises the adhesive structures of the present application or the contact or adhesion surface according to the present application. In another possible embodiment of the present application, the adhesion cylinder 9 of the cutting device 8 may additionally comprise the contact surface or adhesion surface of the present application. Once the cut label 3, on the glue applicator cylinder 15, has glue applied to the back of the label 3, the label 3 may then be transferred, by the glue applicator cylinder 15 to a box or flat-sided or substantially flat-sided container or flat-sided or substantially flat-sided package on a box carrier 55.

Figure 12:
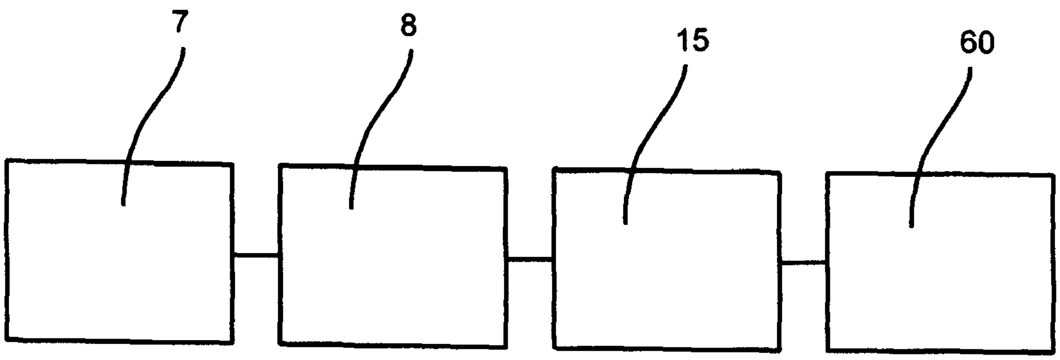
FIG. 12 is a block diagram of a labeling device according to the present application.

FIG. 12 shows a block diagram of one possible embodiment of the present application. A storage mechanism 7 is configured to provide label material to a cutting device 8. The cutting device 8 cuts the label material into individual labels 3. The label 3 may then be transferred from the cutting device 8 to the glue applicator cylinder 15. The glue applicator cylinder 15 comprises the adhesive structures of the present application or the contact or adhesion surface according to the present application. In another possible embodiment of the present application, the adhesion cylinder 9 of the cutting device 8 may additionally comprise the contact surface or adhesion surface of the present application. Once the cut label 3, on the glue applicator cylinder 15, has glue applied to the back of the label 3, the label 3 may then be transferred, by the glue applicator cylinder 15 to a bag on a bag carrier 60.

Figure 13:
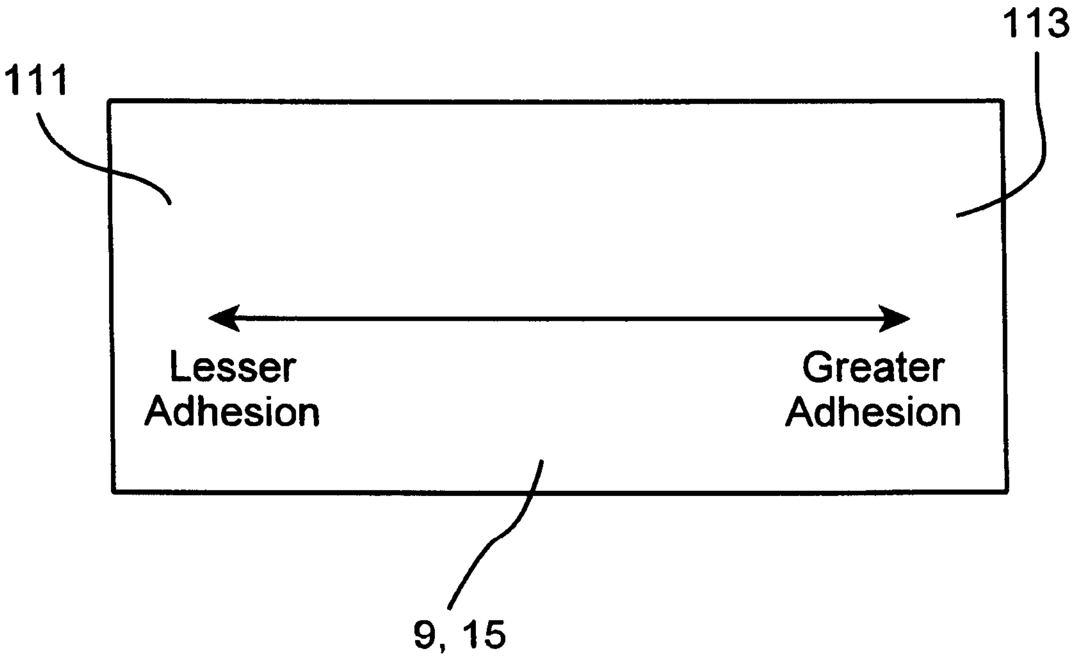
FIG. 13 shows a representation of one possible embodiment of a roller in use with the labeling device of the present application.

FIG. 13 shows a roller 9 or a roller 15 with a scale of adhesion, in which one portion of the roller 9 or roller 15 comprises a portion of lesser adhesion 111 and another portion of the roller comprises a portion of greater adhesion 113.

Figure 14:
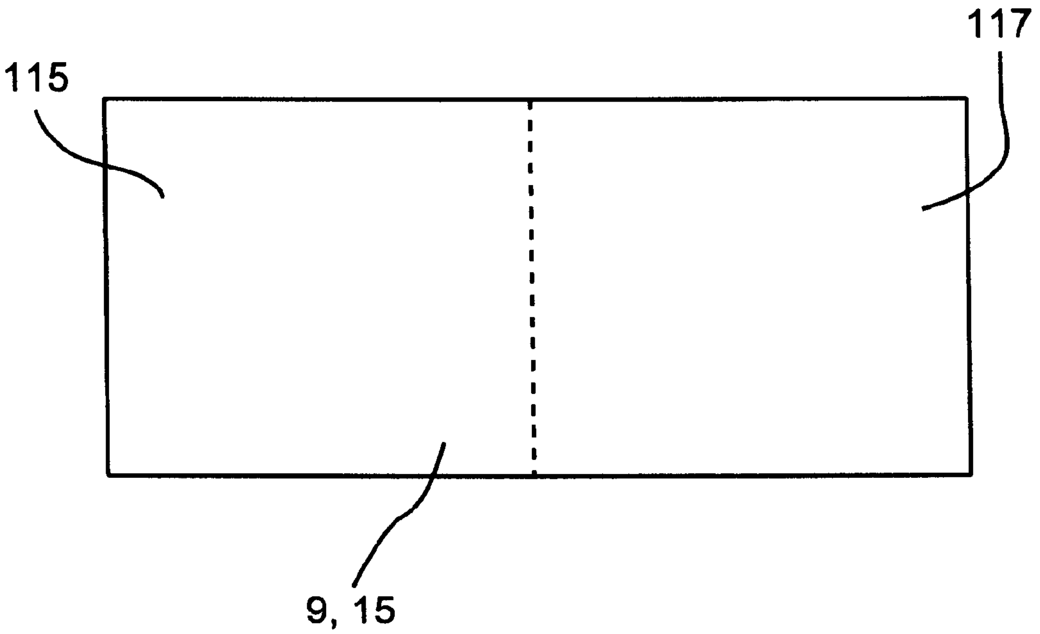
FIG. 14 shows another representation of one possible embodiment of a roller in use with the labeling arrangement of the present application.

FIG. 14 shows a roller 9 or roller 15 with a portion 115 with one gradient of adhesion and a portion 117 with another gradient of adhesion.

Figure 15:
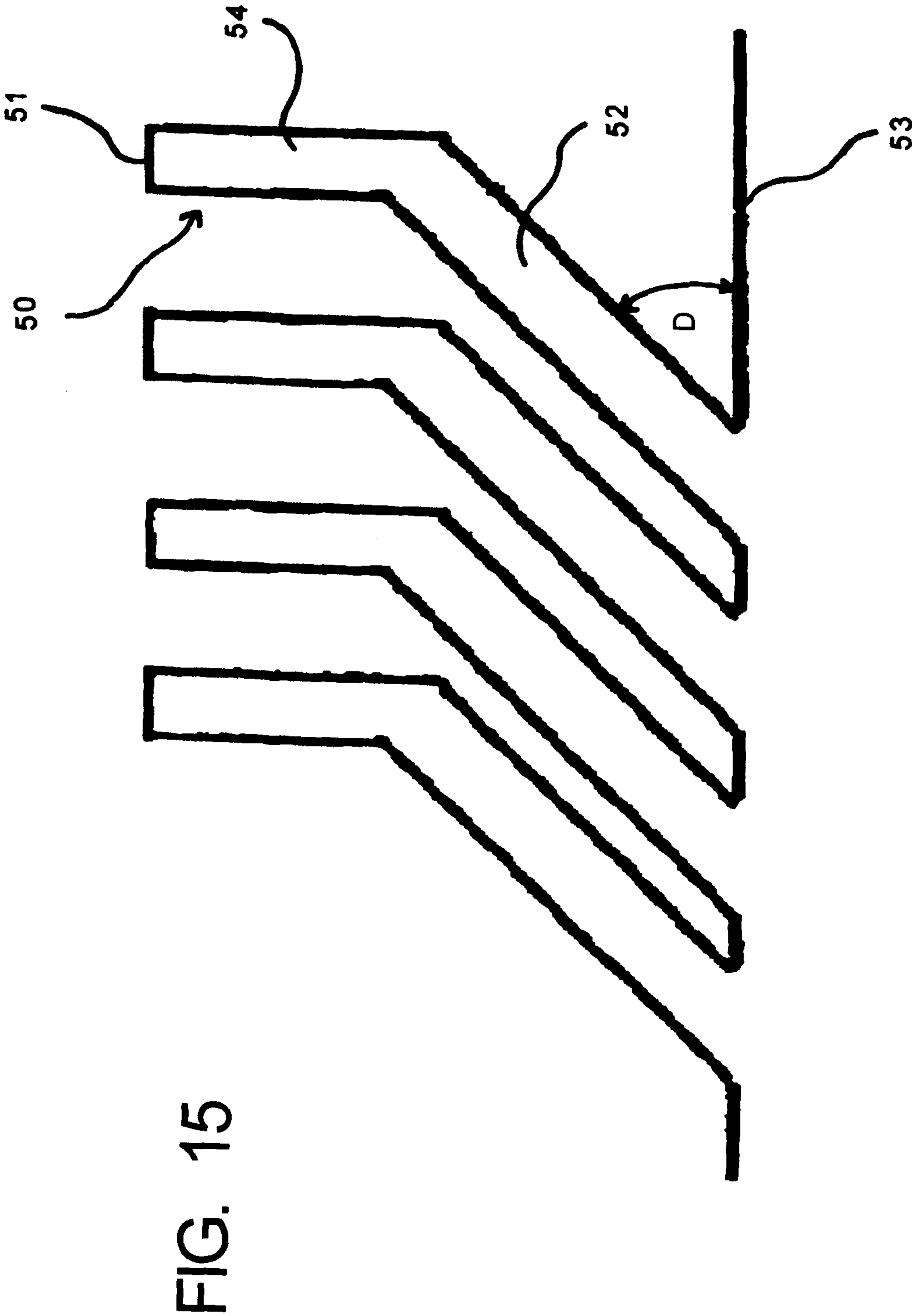
FIG. 15 shows another possible embodiment of a contact surface of the present application.

FIG. 15 shows another possible embodiment of a contact surface of the present application. The projection 50 comprises a bottom part 52 and a top part 54. The bottom part 52 is inclined with respect to the surface 53 by an angle D. The angle D may range from about twenty degrees to about forty degrees. However, the angle D may be smaller or greater in other embodiments of the present application.

Figure 16:
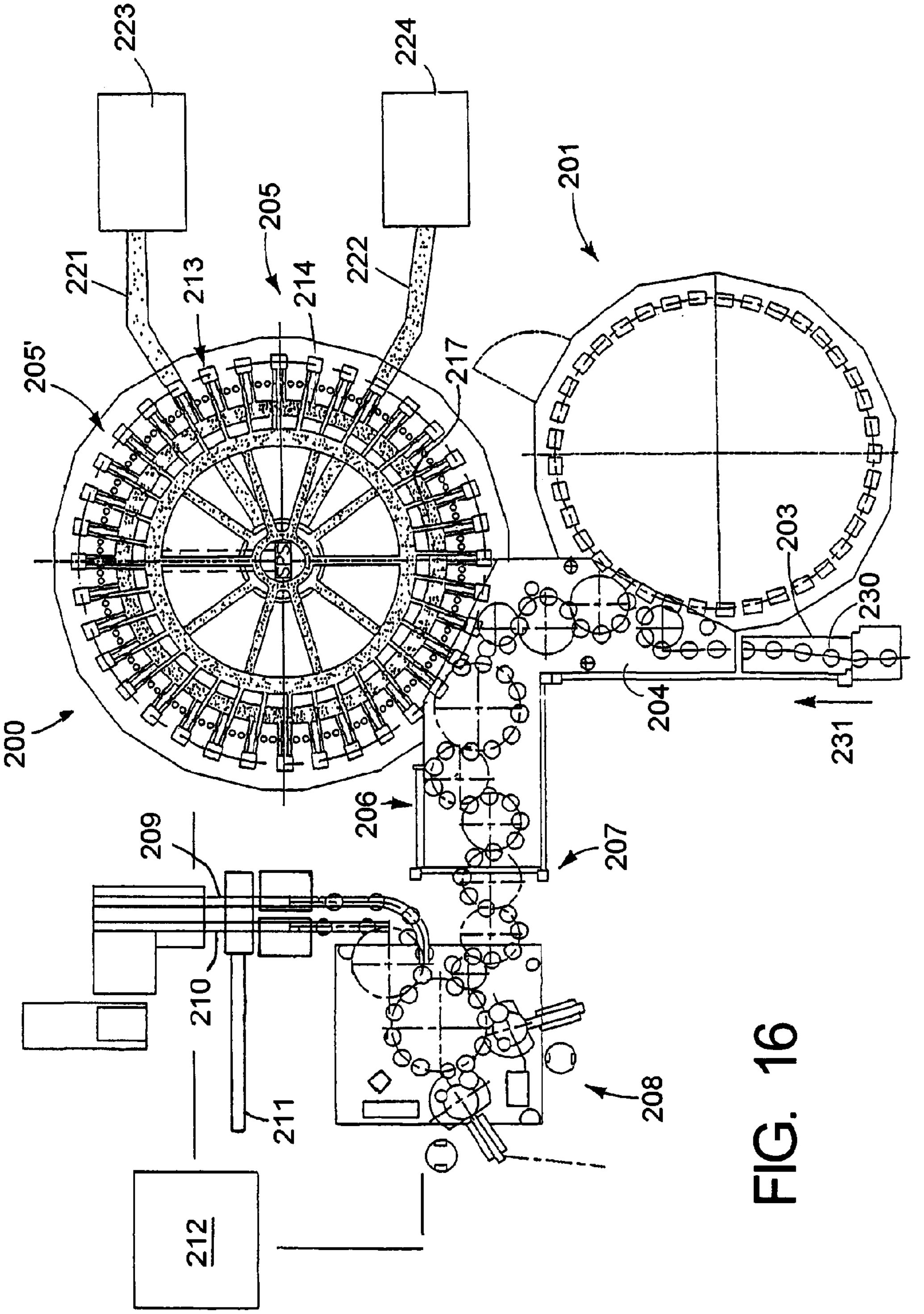
FIG. 16 shows schematically the main components of one possible embodiment example of a system for filling containers, such as beverage bottles.

FIG. 16 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 16 shows a rinsing arrangement or rinsing station 201, to which the containers, namely bottles 230, are fed in the direction of travel as indicated by the arrow 231, by a first conveyer arrangement 203, which can be a linear conveyor or a combination of a linear conveyor and a starwheel. Downstream of the rinsing arrangement or rinsing station 201, in the direction of travel as indicated by the arrow 231, the rinsed bottles 230 are transported to a beverage filling machine 205 by a second conveyer arrangement 204 that is formed, for example, by one or more starwheels that introduce bottles 230 into the beverage filling machine 205.

The beverage filling machine 205 shown is of a revolving or rotary design, with a rotor 205', which revolves around a central, vertical machine axis. The rotor 205' is designed to receive and hold the bottles 230 for filling at a plurality of filling positions 213 located about the periphery of the rotor 205'. At each of the filling positions 203 is located a filling arrangement 214 having at least one filling device, element, apparatus, or valve. The filling arrangements 214 are designed to introduce a predetermined volume or amount of liquid beverage into the interior of the bottles 230 to a predetermined or desired level.

The filling arrangements 214 receive the liquid beverage material from a toroidal or annular vessel 217, in which a supply of liquid beverage material is stored under pressure by a gas. The toroidal vessel 217 is a component, for example, of the revolving rotor 205'. The toroidal vessel 217 can be connected by means of a rotary coupling or a coupling that permits rotation. The toroidal vessel 217 is also connected to at least one external reservoir or supply of liquid beverage material by a conduit or supply line. In the embodiment shown in FIG. 16, there are two external supply reservoirs 223 and 224, each of which is configured to store either the same liquid beverage product or different products. These reservoirs 223, 224 are connected to the toroidal or annular vessel 217 by corresponding supply lines, conduits, or arrangements 221 and 222. The external supply reservoirs 223, 224 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 214 could be connected by separate connections to each of the two toroidal vessels and have two individually-controllable fluid or control valves, so that in each bottle 230, the first product or the second product can be filled by means of an appropriate control of the filling product or fluid valves.

Downstream of the beverage filling machine 205, in the direction of travel of the bottles 230, there can be a beverage bottle closing arrangement or closing station 206 which closes or caps the bottles 230. The beverage bottle closing arrangement or closing station 206 can be connected by a third conveyer arrangement 207 to a beverage bottle labeling arrangement or labeling station 208. The third conveyor arrangement may be formed, for example, by a plurality of starwheels, or may also include a linear conveyor device.

In the illustrated embodiment, the beverage bottle labeling arrangement or labeling station 208 has at least one labeling unit, device, or module, for applying labels to bottles 230. In the embodiment shown, the labeling arrangement 208 is connected by a starwheel conveyer structure to three output conveyer arrangements: a first output conveyer arrangement 209, a second output conveyer arrangement 210, and a third output conveyer arrangement 211, all of which convey filled, closed, and labeled bottles 230 to different locations.

The first output conveyer arrangement 209, in the embodiment shown, is designed to convey bottles 230 that are filled with a first type of liquid beverage supplied by, for example, the supply reservoir 223. The second output conveyer arrangement 210, in the embodiment shown, is designed to convey bottles 230 that are filled with a second type of liquid beverage supplied by, for example, the supply reservoir 224. The third output conveyer arrangement 211, in the embodiment shown, is designed to convey incorrectly labeled bottles 230. To further explain, the labeling arrangement 208 can comprise at least one beverage bottle inspection or monitoring device that inspects or monitors the location of labels on the bottles 230 to determine if the labels have been correctly placed or aligned on the bottles 230. The third output conveyer arrangement 211 removes any bottles 230 which have been incorrectly labeled as determined by the inspecting device.

The beverage bottling plant can be controlled by a central control arrangement 212, which could be, for example, computerized control system that monitors and controls the operation of the various stations and mechanisms of the beverage bottling plant.

The present application was described above with reference to one possible embodiment. It goes without saying that numerous modifications and variations are possible in the area of the labeling machine without thereby going beyond the teaching of the present application. The replacement of the conventional vacuum cylinder or vacuum adhesion elements by appropriate self-adhesive cylinders or self-adhesive elements according to the present application would be within the teaching of the present application.

In a labeling device for containers 2 comprising at least one transport element 9, 15 for transporting, conveying, and applying labels 3, wherein the transport element has at least one contact element with at least one contact surface, on which at least one label is affixed in an adhesive manner during the intended operation in order to transfer the same onto the container surface, the contact surface is a surface having increased adhesion, which is to say the label is held affixed to the same by means of increased van der Waal adhesion forces between the label and the contact surface.

One feature or aspect of an embodiment is believed at the time of the filing of this patent application to possibly reside broadly in a labeling device for containers, comprising at least one transport element for the transport and application of labels, whereby the transport element has at least one contact element with at least one contact surface on which, during proper operation, at least one label is held to transfer this label to the container surface, wherein the contact surface is a surface with increased adhesion.

Another feature or aspect of an embodiment is believed at the time of the filing of this patent application to possibly reside broadly in the labeling device, wherein the contact surface is a structured surface with increased adhesion.

Yet another feature or aspect of an embodiment is believed at the time of the filing of this patent application to possibly reside broadly in the labeling device, wherein the contact surface is a structured surface with increased adhesion, in that said structured surface has a plurality of projections with a bottom part and a top part, whereby the top part has an end surface that is directed away from the surface, whereby each projection is of a size such that the end surfaces are at the same vertical distance from the base surface and form an adherent contact surface that is interrupted by spaces between the end surfaces, whereby the bottom parts are inclined with respect to the surface normal.

Still another feature or aspect of an embodiment is believed at the time of the filing of this patent application to possibly reside broadly in the labeling device, wherein the majority of the neighboring end surfaces are separated by a distance between one nanometer and ten micrometers.

A further feature or aspect of an embodiment is believed at the time of the filing of this patent application to possibly reside broadly in the labeling device, wherein the characteristic cross section geometry of the end surfaces lies between one nanometer and five micrometers.

Another feature or aspect of an embodiment is believed at the time of the filing of this patent application to possibly reside broadly in the labeling device, wherein the inclination of the bottom part with respect to the surface normal is between twenty degrees and forty degrees.

Yet another feature or aspect of an embodiment is believed at the time of the filing of this patent application to possibly reside broadly in the labeling device, wherein the necessary and/or desired adhesion force is set with regard to the individual type of label by the variation or one or more of the parameters listed below:

a) angle of inclination of the base part b) average distance between the end surfaces c) number of end surfaces on the contact surface d) distance of the end surfaces from the base surface e) average characteristic cross section geometry Still another feature or aspect of an embodiment is believed at the time of the filing of this patent application to possibly reside broadly in the labeling device, wherein the contact element comprises at least one base body and one carrier element, whereby the carrier element can easily by mechanically detached from the base body, and the contact surface is located on the base body.

A further feature or aspect of an embodiment is believed at the time of the filing of this patent application to possibly reside broadly in the labeling device, wherein at least one gas outlet is located in the contact surface and is in communication by means of suitable devices with a gas feed line, to assist in the release process by means of a puff or current of gas on the label.

Another feature or aspect of an embodiment is believed at the time of the filing of this patent application to possibly reside broadly in the labeling device, wherein a plurality of gas outlets are arranged in a row next to one another or one beneath another.

Yet another feature or aspect of an embodiment is believed at the time of the filing of this patent application to possibly reside broadly in the labeling device, wherein it is configured so that it has an adhesion gradient.

Still another feature or aspect of an embodiment is believed at the time of the filing of this patent application to possibly reside broadly in the labeling device, wherein going forward in the direction of transport, the adhesion of the surface in the contact area of a label is less than in the rest of the contact area of the label.

A further feature or aspect of an embodiment is believed at the time of the filing of this patent application to possibly reside broadly in the labeling device, wherein this it comprises a cutting roller on which the surfaces to the left and right of the cutting line are shaped so that they have different adhesion forces.

One feature or aspect of an embodiment is believed at the time of the filing of this patent application to possibly reside broadly in a method for the labeling of containers, wherein a device according to the present application is used, whereby the label is held on the contact surface by adhesion forces between the label and the contact surface.

Another feature or aspect of an embodiment is believed at the time of the filing of this patent application to possibly reside broadly in the method, wherein the adhesion forces are Van de Waal forces.

Yet another feature or aspect of an embodiment is believed at the time of the filing of this patent application to possibly reside broadly in the method, wherein it comprises at least the steps listed below:

a) The contact surface is placed in contact with the surface of label which is located in a storage device.

b) The label is lifted or extracted from the storage device.

c) The label adhering to the contact surface is delivered to the container surface.

d) At least a first partial surface of the label is placed in contact with and made to adhere to the surface of the container.

e) Full separation of the contact surface from the image side of the label.

Still another feature or aspect of an embodiment is believed at the time of the filing of this patent application to possibly reside broadly in the method for the labeling of containers, wherein before step d), an adhesive is applied to at least a partial area of the label.

A further feature or aspect of an embodiment is believed at the time of the filing of this patent application to possibly reside broadly in the method, wherein a labeling device according to the present application, and simultaneously or substantially simultaneously or immediately or substantially immediately after the first contact with the downstream surface, a gas current or puff is applied to the label to support the release process.

Another feature or aspect of an embodiment is believed at the time of the filing of this patent application to possibly reside broadly in the use of the device according to the present application for the labeling of containers from the group of bottles, bags, cans or similar containers.

Yet another feature or aspect of an embodiment is believed at the time of the filing of this patent application to possibly reside broadly in the use of the device according to the present application for the labeling of box-like containers with essentially flat side walls.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The following articles are incorporated by reference: "Researchers discover how geckos know when to hold tight," by Peter Kent, published by clemson.edu, on Aug. 6, 2009; "Gecko-like glue is said to be stickiest yet," by Julie Steenhuysen, published by Reuters.com, on Oct. 9, 2008; "Nanotube adhesive sticks better than a gecko's foot," by the Rensselaer Polytechnic Institute, published by physorg.com, on Jan. 17, 2007; and "UA synthetic gecko foot-hairs leading to reusable adhesives," by the University of Akron, published by uakron.edu, on Aug. 12, 2005.

The U.S. Patent Application Publication No. 2008/0110557, having the title "METHODS AND COMPOSITIONS FOR PROVIDING PREFERENTIAL ADHESION AND RELEASE OF ADJACENT SURFACES," published on May 15, 2008 is incorporated herein as if set forth in its entirety.

The following patents, patent applications or patent publications, relating to adhesives that mimic structures on the Tokay Gecko by adhering to surfaces by van der Waal's interactions, are hereby incorporated by reference as if set forth in their entirety herein: U.S. Pat. No. 6,737,160; and U.S. patent application Ser. No. 10/197,763.

Some examples of adhesive structures which may possibly be utilized or adapted for use in at least one possible embodiment according to the present application may possibly be found in the following U.S. Pat. No. 7,479,198, published on Jan. 20, 2009; U.S. Pat. No. 7,294,397, published on Nov. 13, 2007; U.S. Pat. No. 7,327,037, published on Feb. 5, 2008; and U.S. Pat. No. 7,229,685, published on Jun. 12, 2007.

The following patents, patent applications or patent publications, are hereby incorporated by reference as if set forth in their entirety herein: DE 20 2006 011 787 U1, having the following English translation of the German title "Transport roller for labels in a labeling device comprises a peripheral surface formed by molding parts which are held by axially tensioning between a support element provided on a shaft and a clamping or tensioning element on the shaft," published on Sep. 28, 2006; DE 197 19 420 A1, having the following German title "Vorrichtung zum Aufbringen von Etiketten," published on Nov. 19, 1998; DE 20 2005 007 470 U1, having the following English translation of the German title "Withdrawal device e.g. for labels, has label container, labeling cylinder and adhesive applicator for withdrawal members with height and extent of withdrawal member swivelly fixed on rotary carrier," published on Jul. 7, 2005; DE 102 23 234 B4, having the following English translation of the German title "METHODS FOR MODIFYING SURFACES OF A SOLID AND MICROSTRUCTURED SURFACES WITH ENCREASED ADHERENCE PRODUCED WITH SAID METHODS," published on Dec. 11, 2003.

All of the patents, patent applications or patent publications, which were cited in the International Search Report dated Apr. 21, 2008, and/or cited elsewhere are hereby incorporated by reference as if set forth in their entirety herein as follows: WO 2007/077036, having the title "METHOD FOR APPLYING A LABEL AND LABELLING INSTALLATION," published on Jul. 12, 2007; and U.S. Pat. No. 5,776,289 and, having the title "APPARATUS AND METHOD FOR APPLYING LABELS USING STATIC ELECTRICAL ATTRACTION," published on Jul. 7, 1998.

All of the patents, patent applications or patent publications, which were cited in the German Office Action dated Jul. 13, 2007, and/or cited elsewhere are hereby incorporated by reference as if set forth in their entirety herein as follows: DE 42 38 189, having the following English translation of the German title "Applying labels to packages—using intermediate pick-up element holding label through adhesion with less adhesive force than final adhesive fixing force," published on May 19, 1994; DE 10 2006 021 056, having the following English translation of the German title "Method for applying labels to objects, especially bottles, involves storing labels in magazine and removing labels from magazine by removal pallet," published on Jun. 28, 2007; and U.S. Pat. No. 3,379,466, having the title "PRESSURE-SENSITIVE LABEL RECEIVING AND APPLYING STATION," published on Apr. 23, 1968.

Some examples of labeling machines which may possibly be utilized in at least one possible embodiment may possibly be found in the following U.S. Pat. No. 6,634,400, entitled "Labeling machine;" U.S. Pat. No. 6,561,246, entitled "Labeling machine capable of precise attachment of a label to different sizes of containers;" U.S. Pat. No. 6,550,512, entitled "Labeling machine capable of preventing erroneous attachment of labels on containers;" U.S. Pat. No. 6,543,514, entitled "In-line continuous feed sleeve labeling machine and method;" U.S. Pat. No. 6,378,587, entitled "Cylindrical container labeling machine;" U.S. Pat. No. 6,328,086, entitled "Labeling machine;" U.S. Pat. No. 6,315,021, entitled "Labeling machine;" U.S. Pat. No. 6,263,940, entitled "In-line continuous feed sleeve labeling machine and method;" U.S. Pat. No. 6,199,614, entitled "High speed labeling machine having a constant tension driving system;" U.S. Pat. No. 6,167,935, entitled Labeling machine; U.S. Pat. No. 6,066,223, entitled Labeling machine and method; U.S. Pat. No. 6,050,319, entitled "Non-round container labeling machine and method;" and U.S. Pat. No. 6,045,616, entitled "Adhesive station and labeling machine."

Some examples of gluing devices or apparatuses configured to apply glues to labels, which may possibly be utilized or adapted for use with at least one possible embodiment of the present application, may possibly be found in the following U.S. Pat. No. 7,074,295, having the title "Labelling apparatus and method for correcting visual adhesive defects," published on Jul. 11, 2006; U.S. Pat. No. 6,616,780, having the title "Method and device for supplying labels to labeling device," published on Sep. 9, 2003; U.S. Pat. No. 6,488,794, having the title "Computer controlled labeling machine for applying labels including stretch labels and tactilely sensibly indicia on articles," published on Dec. 3, 2002; U.S. Pat. No. 5,116,452, having the title "Device for applying labels to containers," published on May 26, 1992; U.S. Pat. No. 4,802,440, having the title "Glue applicator for labeling machine," published on Feb. 7, 1989; and U.S. Pat. No. 4,685,417, having the title "Gluing device for labeling machines," published no Aug. 11, 1987.

Some examples of methods and apparatuses for applying labels to bags, which may possibly be utilized or adapted for use with at least one possible embodiment of the present application, may possibly be found in the following U.S. Pat. No. 7,322,162, having the title "Bag top folder and labeler," published Jan. 29, 2008; and U.S. Pat. No. 5,232,540, having the title "Automatic labeling machine and method," published on Aug. 3, 1993.

The patents, patent applications, and patent publication listed above in the preceding ten paragraphs are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 009 152.6, filed on Feb. 24, 2007, having inventor Volker TILL, and DE-OS 10 2007 009 152.6 and DE-PS 10 2007 009 152.6, and International Application No. PCT/EP2007/009792, filed on Nov. 13, 2007, having WIPO Publication No. WO 2008/101527 and inventor Volker TILL, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2007/009792 and German Patent Application 10 2007 009 152.6, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/009792 and DE 10 2007 009 152.6 from which this patent application claims priority which do not have to do with the correction of the translation in this patent application are not to be included in this patent application in the incorporation by reference.

Any statements about admissions of prior art in the original foreign patent applications PCT/EP2007/009792 and DE 10 2007 009 152.6 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of labeling containers, said method comprising:

generating a force of adhesion between a contact surface of a transfer element of a labeling arrangement and a label, without externally-generated forces, and thereby holding the label on said contact surface; and transporting and applying the label to the surface of a container using said labeling arrangement.

2. The method according to claim 1, wherein said step of generating a force of adhesion comprises generating Van de Waal forces between said contact surface and a label.

3. The method according to claim 2, wherein said step of transporting and applying labels to the surfaces of containers comprises:

lifting and extracting a label from a storage device;

contacting an image side of the label with said contact surface;

delivering the label to a container;

placing at least a first partial surface of a rear or trailing end of the label in contact with a surface of the container; and separating the label from said contact surface.

4. The method according to claim 3, wherein said method further comprises:

applying an adhesive to at least a partial area of the label before said step of delivering the label to a container; and simultaneously or immediately after the first contact with the container, applying a gas current or puff to the label in order to promote said separating of said contact surface and the image side of the label.

5. The method according to claim 4, wherein said method further comprises labeling one of bottles, bags, cans, or box-like containers with essentially flat side walls.

6. A labeling arrangement for labeling containers comprising:

at least one transfer element configured to transport and apply labels to containers;

said at least one transfer element comprising a contact surface structured to contact and hold a label;

said contact surface being structured to generate substantially all of a force of adhesion sufficient to hold a label thereon, which force of adhesion being less at a first portion of said contact surface than at a second portion of said contact surface;

one of (A) and (B):

(A) said first portion of said contact surface being disposed to hold, in the direction of movement of a label, a leading end portion of the label; and said second portion of said contact surface being disposed to hold a trailing end portion of the label with a greater force of adhesion than said first portion of said contact surface; and (B) said labeling arrangement comprising a cutting arrangement configured to cut individual labels from a strip of label material; and said first and second portions of said contact surface being disposed on either side of a point at which said cutting arrangement cuts the label material, to thereby exert different forces of adhesion, in the direction of movement of the label material, on a leading end portion of the label material and a trailing end portion of the cut label;

said contact surface comprises a base surface and a plurality of projections projecting from said base surface;

each of said projections comprises an end surface;

said end surfaces are disposed adjacent one another to form an adherent contact area that is interrupted by spaces between said end surfaces; and said end surfaces are dimensioned and spaced apart to promote generation of Van de Waal forces sufficient to hold a label on said contact surface.

7. The labeling arrangement according to claim 6, wherein:

each of said end surfaces is disposed at essentially the same distance from said base surface;

each of said projections comprises:

a bottom part being disposed adjacent said base surface; and a top part being disposed opposite said bottom part and further away from said base surface than said bottom part; and said bottom parts of said projections are inclined with respect to said base surface.

8. The labeling arrangement according to claim 7, wherein a substantial number of said end surfaces are separated by a distance between about one nanometer and about ten micrometers.

9. The labeling arrangement according to claim 8, wherein the cross section geometry of each of said end surfaces lies between about one nanometer and five micrometers.

10. The labeling arrangement according to claim 9, wherein each of said bottom parts are inclined with respect to said base surface by between about twenty degrees and about forty degrees.

11. The labeling arrangement according to claim 10, wherein at least one of: angle of inclination of said bottom parts, average distance between said end surfaces, number of end surfaces, distance of said end surfaces from said base surface, and average cross section geometry of said end surfaces, is adjustable to adjust the force of adhesion generated by said contact surface to accommodate different labels.

12. The labeling arrangement according to claim 11, wherein:

said transfer element comprises a base body and a carrier element detachably mounted on said base body;

said contact surface is disposed on said carrier element;

said transfer element comprises gas outlets;

said gas outlets are connected to a gas supply;

said gas outlets are each configured to release a puff or current of gas on a label in order to assist in the release of labels; and said gas outlets are arranged in a row next to one another or one beneath another.

13. A labeling arrangement for labeling containers, said labeling arrangement comprising:

at least one transfer element configured to transport and apply labels to containers;

said at least one transfer element comprising a contact surface structured to contact and hold a label;

said contact surface being structured to generate essentially all of a force of adhesion sufficient to hold a label on said contact surface essentially without the use of forces generated outside of said contact surface;

said contact surface comprising a base surface and a plurality of projections projecting from said base surface;

each of said projections comprising an end surface;

said end surfaces are disposed adjacent one another to form an adherent contact area being interrupted by spaces between said end surfaces; and said end surfaces being dimensioned and spaced apart to promote generation of Van de Waal forces sufficient to hold a label on said contact surface.

* * * * *